Oct. 9, 1962 W. P. ASTEN Re. 25,258

PHOTOELECTRIC DEVICES

Original Filed Sept. 25, 1957

INVENTOR
WILLIAM P. ASTEN

BY Hurwitz & Rose

ATTORNEYS

United States Patent Office

Re. 25,258
Reissued Oct. 9, 1962

25,258

PHOTOELECTRIC DEVICES

William P. Asten, Aldie, Va., assignor, by mesne assignments, to Melpar, Inc., Falls Church, Va., a corporation of Delaware Original No. 2,920,209, dated Jan. 5, 1960, Ser. No. 686,091, Sept. 25, 1957. Application for reissue Mar. 14, 1961, Ser. No. 95,763
5 Claims. (Cl. 250—239)

Matter enclosed in heavy brackets [ ] appears in the original patent but forms no part of this reissue specification; matter printed in italics indicates the additions made by reissue.

This invention relates generally to photoelectric apparatus and more particularly to an improved apparatus that includes a compact arrangement of miniature photoelectric elements.

Further, this invention relates to a photoelectric unit employing a novel light sensitive element which is part of a control circuit and in the path of reflected light beams whereby intensity changes of the reflected light will correspondingly condition a control circuit which then initiates a desired operation. The interruption of modification of a beam of light can produce in this miniature photocell circuit, electric pulsations which may be converted to operate a relay or supply a change in voltage or current capable of operating electronic circuits at a relatively high speed.

The prior art discloses that it has been proposed for such purposes to concentrate light beams by optical means and deviate a light beam by means of reflectors. The usefulness and applicability of such arrangements is often restricted by the necessity of aligning light source and photoelectric cell, and of using inconvenient optical systems.

Prior to the present invention, it has been customary to utilize at least two lenses, that is, one lens system being provided to direct the light to the photocell or the reflecting surface, and a separate lens system being provided to direct the direct or reflected light to the photocell.

According to the present invention the reflected light ray or beam (hereinafter referred to as "beam") controlling the light sensitive element (hereinafter referred to as "cell") of a photoelectric circuit is guided through its path from the light source (hereinafter referred to as "source") to the cell in a light confining single lens member (hereinafter referred to as "lens") which is correlated to the object (hereinafter referred to as "object"), which controls the effective light flux. The single lens system of this type consists of a solid cylindrical rod of refractive material as quartz glass or plastic material of the type of polymerized methyl methacrylate and having polished surfaces. Light projected into the surface of such a shape rod is reflected within the rod, and consequently there is little loss of light flux. The introduction of such a lens into a photoelectric control system considerably extends to the usefulness of such devices and permits their application to purposes for which they could heretofore not be used.

It is the principal object of the invention to control the the projected and reflected light path of a photoelectric arrangement by confining an effective beam in a suitably arranged single lens. In one of its features, the invention permits the use of a photoelectric system in situations where alignment of source, object and cell is impossible or impractical, or where the environment resists the available space to such an extent that conventional photoelectric units can be used only with difficulty or not at all because they are too bulky and large so that the beam would not reach the object. In this type of application, a single lens system may to advantage replace a two lens system. In another feature, the invention permits the gathering of light from a source, and the conducting of the light flux thus gathered towards a flux controlling object and a flux-intensity cell. In another feature, the system according to the invention permits the conducting of a selected light component through an area of general local illumination, whereby only the selected component will influence the cell to which it can be conducted through the cylindrical path and restricted space. Also, it is obvious that the available light flux may be rendered more effective in certain instances by shaping the light (receiving or emitting) surfaces of the lens to conform to characteristics of light source, flux varying object or cell.

Another object of the invention is to provide photoelectric apparatus of the above type which is simple, miniature, compact, and easy to operate.

Still another object of the invention is to provide an activator in the control circuit that is extremely sensitive to light and responds by producing wide changes in its internal resistance or power output across its terminals. An activator of this type may be a cadmium sulfide photocell, a germanium junction or a vacuum cell.

Other objects and many of the attendant advantages of this invention will be appreciated readily as the same becomes better understood by reference to the following detailed description, when considered in connection with the accompanying drawings, wherein.

Figure 1:
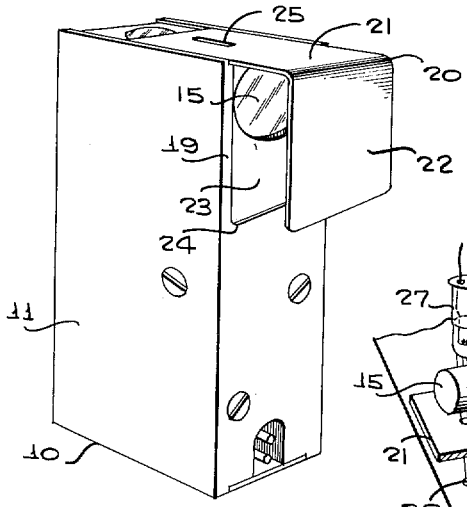
FIG. 1 is a perspective view of the photoelectric device with the upper cover partially open.

Specifically describing the embodiment of the invention illustrated in FIG. 1 to FIG. 5, inclusive, the reference character 10 generally designates the photoelectric device including a rectangular body 11 and multiplicity of interconnected compartments therein. The body 11 preferably is formed of an opaque material. The multicompartment device 10 has principally an upper compartment 12 which has a cylindrical configuration and two compartments 13 and 14 in a contiguous parallel arrangement and perpendicular to compartment 12. The compartments 13 and 14 are located below compartment 12 in FIG. 4 and are preferably cylindrical in shape.

A single cylindrical glass or plastic rod or lens 15 is inserted in position in compartment 12 through the opening 16 which is located on the upper portion of sidewall 17 of the body 11. The lens 15 has a length which is substantially equal to the width of body 11 and which overlies the compartments 13 and 14 in a perpendicular relationship.

The compartment 12 has a pair of ribs 18 formed along the length thereof and a pair of ribs 19 formed along the height thereof to accommodate the cover member 20. The cover 20 has a horizontal flange 21 as shown in FIG. 1 that constitutes the portion that overlies the length of lens 15 when the cover 20 is in its closed position. The vertical portion of the cover 20 is a depending flange 22 that overlies the opening 16 when the cover 20 is in its closed position. The flange 22 slides firmly and securely in the recess 23 formed by the vertical ribs 19 and shoulder 24. Ordinary friction between ribs 18, 19, shoulder 24, and the edges of the cover is sufficient to fold the slidable cover 20 in its closed position. The shoulder 24, the edges of cover 20 and the inner edges of ribs 18, 19 may be beveled if found desirable. It is seen from FIG. 1 that the cover 20 may be readily moved on or off the body 11. The cover 20 is provided with an elongated rectangular shaped light (receiving and emitting) slot or aperture 25 of a desired length that is located near the end of cover 20 which is on opposite side from the vertical flange 22.

The photoelectric cell 26 and the light source 27 which may be an incandescent lamp are mounted by any suitable means in compartments 13 and 14, respectively. The cell 26 and source 27 are placed in a juxtaposition in the body 11. The cell 26 can be inserted through the upper compartment 12 when the lens 15 and cover 20 have been removed from the body 11.

The body 11 has a pair of ribs 28 formed along the bottom thereof to accommodate the lower slidable cover 29. The cover 29 is retained in its closed position by ordinary friction between ribs 28 and the edges of the cover 29. The edges of cover 29 and the inner edges of ribs 28 may be beveled if found desirable. The source 27 is inserted through the bottom of the body 11 when cover 29 has been removed from the body 11.

The photoelectric cell 26 may be provided with an output conductor cable 30. The cell 26 may be energized by a current source (not shown). The light source 27 may be energized by a suitable current source (not shown) through a cable 31. The cables 30 and 31 may pass through an opening 32 on the lower portion of the sidewall 17 of the body 11.

Figure 4:
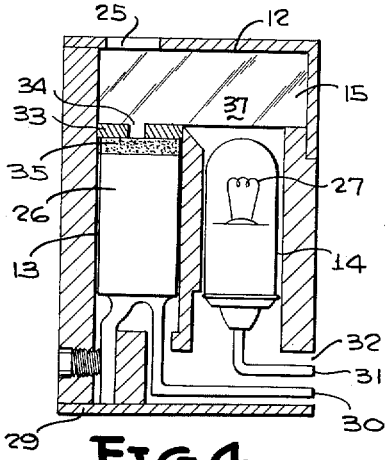
FIG. 4 is a longitudinal sectional view of the photoelectric unit of FIG. 1.
Figure 5:
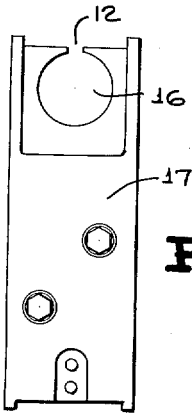
FIG. 5 is a right side view of the photoelectric unit of FIG. 1 with the upper and lower covers and lens removed.

The horizontal wall member 33 is shown in FIG. 4 and has been provided with an aperture 34. The wall member 33 is interposed between the cell 26 and the cylindrical lens 15 to limit the response of the cell to a selected portion of the illuminated image. An aperture arrangement of this type in conjunction with a high speed vacuum cell can be utilized for example, in photo facsimile transmitter scanning equipment. The wall member 33 could be omitted in the body 11 if found desirable.

A filter structure 35 of the conventional type may be included adjacent the wall member 33 without departing from the spirit of the present invention. This filter structure may be of different spectral absorption characteristics selectively movable into the path of light impinging on the photocell.

A wall member or barrier 36 is interposed between cell 26 and source 27. The top edge, that is, the edge 37 of barrier 36 adjacent the lens 15 may be beveled to permit more readily the passage of light from source 27.

The photoelectric unit 10 may be employed in many of the most widely used electronic controls. As a general rule, a photoelectric control circuit is designed to perform some function as a result of an interruption or a change in intensity in a transmitted or reflected light beam. In some cases, this function is the closing or opening of an electromagnetic relay which, in turn, controls the operation of another item of equipment, such as an alarm signal, an electric motor, a solenoid, electromagnetic counter or a timer.

It is to be noted that the basic problem of operating a relay by changing the intensity or interrupting a light beam appears to be a relatively simple one. And in some cases it is. But unfortunately, due to the characteristics of available light-sensitive devices, many of the practical circuits employed in the past have been relatively expensive and complicated. The basic light-sensitive device has been used in conjunction with one or more stages of amplification, employing either gas-filled or vacuum amplifier tubes. The use of such amplifiers adds several complications; not only are a number of additional components required by the amplifier stage itself, but both high plate and low filament voltage power sources may be needed.

One proposed solution to this problem is to use e semiconductor that is extremely sensitive to light and responds by producing wide changes in its internal resistance. With no light, a cell of this type may have as high as 100 megohms resistance and when strongly energized by light, the resistance may drop to as low as 25,000 ohms.

In cases of this invention where moderate sensitivity is required, a cadmium sulfide photocell of the type herein described has been readily used with great success. The cadmium sulfide photocell is sufficiently sensitive to permit its operation in most applications without requiring an amplifier stage. Where moderate light intensities are available, a relay circuit may be designed around a high resistance relay, a simple D.C. power source, and the cadmium sulfide photocell itself.

One small type cadmium sulfide photocell which may be used in the principal embodiment of this invention is only ¼″ in diameter by ⅜″ in height. In spite of its small size, when used in an appropriate circuit, this unit can deliver as much as 1.5 to 5 milliamperes when exposed to from 50 to 100 foot candles' illumination. Thus the photocell unit of this type may be miniature and compact.

Cadmium sulfide, as used in a photocell, is photoconductive. Thus, when the cell is dark, its resistance is quite high and, when illuminated, its resistance decreases. Practical considerations have limited the use of cadmium sulfide in photocells. Chief among these limitations has been its speed of response. But new techniques have permitted a reduction in response time to the point where some of these units have a response time as short as 5 milliseconds in practical circuits. This is ample for the majority of control and counting applications.

With moderate D.C. voltages, a cadmium sulfide photocell has a comparatively high output, capable of operating many standard relay types directly. At low light levels, a cadmium sulfide photocell has quite a linear response, with highly linear resistance changes being obtained from 1 foot candle to 0.0001 foot candle and lower. The cadmium sulfide photocell is therefore well suited to the design of instruments for measuring minute changes in light intensity with good accuracy. With greater illumination, a less linear response may be obtained, but since high light levels are generally used primarily for "on-off" control and counting applications, linearity of response is less important.

The spectral response peak occurs at approximately 5200 angstrom units in the visible light range. Among other things, a cadmium sulfide photocell is quite sensitive to X-rays.

Different types of such photocells are available. Such things as speed of response, impedance sensitivity, etc. can be varied to meet the requirement of the technician. The cadmium sulfide photocell is described herein for illustration purposes only.

It is of particular interest to note the minute size of the sensitive area of photocell 26, for example, two square millimeters. Since the point sensitivity of the much larger sensitive surfaces of conventional photocells is frequently non-uniform, difficulties may be encountered in applications requiring a small, sharply focused beam of light. In a conventional photocell, a pin-point light beam hitting only one part of the sensitized surface may give a different response than when striking another part. With the small sensitive area of cadmium sulfide photocell 26 the entire area will be covered by the light, even with quite small beams, insuring a consistently uniform response.

Further, the photo-sensitive cell 26 may be formed of molybdenite or sulphide of molybdenite, or germanium junction, or a high-speed vacuum cell such as the 1P42, although other forms of photo-sensitive or light reactive materials may be employed, such as conditions or preference may dictate, as for example, sulphide of antimony or selenium or stilnite.

A cadmium sulfide photocell relay may be used in any general application requiring a photocell relay of moderate sensitivity. It may be used as a burglar alarm, as a doorway annunciator, as an automatic light switch, as a door opener, as a jam detector on conveyor lines, as a counter, as a light switch, as a smoke alarm or in similar control applications. A simple light source must be provided, of course, and the controlled device and its power source connected to the proper relay contacts. Small chimes, alarm bells, and signal lights may be operated directly with the relay. Such devices may be used in an annunciator, burglar alarm, and jam detector applications. But where any great amount of power is to be handled, as where the controlled device is a heavy duty solenoid or motor, then a separate heavy-duty power relay should be provided, with its energizing coil operated by the sensitive relay in the photocell assembly.

In general, the more sensitive the relay, the more sensitive will be the complete device (requiring less light for operation). If other relays are used, it may be found possible to use a supply voltage of less than 15 volts.

But the cadmium sulfide photocell system is not *to* be considered limited to relay control applications. A variety of operations may be performed by the action of the cells.

The cadmium sulfide photocell system is potentially suited to any application requiring a compact, reliable, inexpensive and fairly rugged light-sensitive device such as pyrometers, colorimeters, sound-reproduction, densitometers, and light measuring instruments.

Since the current requirements are small (approximately 1 ma.) a battery might be substituted for the A.C. power supply for remote operation. Battery life will depend on the size and type of battery employed, of course. In any case, the choice of a battery should depend on the intended operation of the unit. A 90-volt battery will give good results, but lower voltages may be used.

Figure 6:
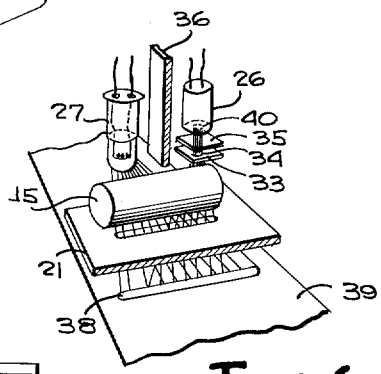
FIG. 6 is a schematic diagram of the operation of the photoelectric unit.
Figure 2:
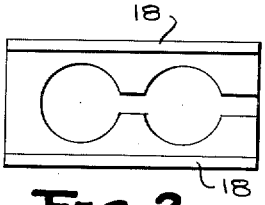
FIG. 2 is a top view of the photoelectric unit of FIG. 1 with the upper cover removed.
Figure 3:
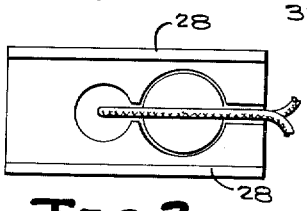
FIG. 3 is a bottom view of the photoelectric unit of FIG. 1, with the lower cover removed.

Referring to FIG. 6, the operation of the single lens system will now be described.

Assuming that the image of the excited incandescent lamp 27 is focused at a convenient spot located outside of the body 11 and due to the configuration of the cylindrical lens 15 the image will take the form of a narrow beam of light 38 on plane 39 which may be several times longer than the actual length of the filament in incandescent lamp 27. The section of the line of light which occurs directly in front of the photocell 26 may then be used to reflect light back to the photocell 26. The cylindrical lens 15 focuses the line of light on the sensitive surface of the photocell 26. The aperture 34 of wall member 33 may be constructed in the unit and will limit the response of the cell 26 to a selected portion of the illuminated image. The barrier 36 between the compartments 13 and 14 and the optical treatment of the internal surfaces of body 11 are sufficient to effectively reduce the effects of direct illumination of the photo-sensitive area 40 on cell 26 from the light source 27. It has been found by the proper selection of photocells, responses of the device are not limited to the light-no light realm of operation but may be made sensitive to different colors as well by the adoption of filters 35 and the selection of photocells.

In operation, light striking the photocell 26 generates sufficient voltage to drive a small current through a low impedance load. The maximum current obtained by the photocell 26 could be, for instance, only a few hundred microamperes.

Numerous modifications and variations of this invention not specifically described herein will be apparent to those skilled in the art and are intended to be comprehended and included herein. Various types of diaphragms or light-admissions controlling means other than that specifically described and illustrated herein may be employed. While this invention has been described as employing a cadmium sulfide photocell, it is not limited to such.

Obviously, many modifications and variations of the present invention are possible in the light of the above teachings. It is therefore to be understood that within the scope of the appended claims the invention may be practiced otherwise than as specifically described.

What I claim is:

[1. A multi-compartmented photoelectric unit having a plurality of compartments in a contiguous arrangement, a photoelectric cell mounted in one compartment and a source of light mounted in another compartment; an elongated compartment perpendicular to said plural compartments and connected thereto, and having a cylindrical lens member slidably mounted therein; a slidable cover member positioned on said elongated compartment, said cover member being provided with an aperture, said aperture being in axial alignment with said photoelectric cell.]

[2. A photoelectric unit in accordance with claim 1, having another slidable cover member to close the bottom of said multi-compartmented unit.]

[3. A photoelectric unit in accordance with claim 1, wherein said cover member has a downwardly turned flange to hold said lens member in operable position.]

[4. A mounting structure for a photoelectric unit having lead-in terminals, said mounting structure comprising a housing open at one end to receive the photoelectric cell, a cylindrical lens in said structure and perpendicular to said cell, and a closure member having a downwardly turned flange for closing the open end of said structure and for retaining said lens in operative position.]

[5. A photoelectric system comprising a rectangular body having a plurality of cylindrical shaped compartments therein, a cylindrical lens member being inserted through an opening in the side wall of said rectangular body, a photocell device and a source for projecting light being mounted in cylindrical compartments in a parallel contiguous relationship to each other and perpendicular to said lens compartment, said photocell device being inserted through said lens compartment prior to the insertion of said lens members; a cover member having a depending flange portion to close said opening and thereby retaining said lens member in an operative position, said cover member being further provided with an aperture; the cylindrical configuration of said lens member forms a narrow beam of light which is transmitted through said aperture to an object; the narrow beam of reflected light immediately in front of said aperture being reflected from the object through said aperture, then said lens focusing said narrow beam of reflected light on the sensitive surface of said cell device whereby the beam of light finally received by said cell device will be an intensity sufficient to operatively actuate said cell device and produce pulsations which are adapted to operate an electronic circuit.]

[6. A miniature photoelectric unit comprising a light source, light responsive means, a single cylindrical lens member slidably and perpendicularly mounted adjacent said light source and said responsive means, said single cylindrical lens member directing light from said light source to an object outside said unit and then focusing reflected light back to said responsive means, and a filter means interposed between said cylindrical lens member and said responsive means.]

*7. A multi-compartmented photoelectric unit having a pair of contiguous compartments having parallel axes, a photoelectric device mounted in one of said compartments and a source of light mounted in another of said compartments, an elongated compartment having an axis extending perpendicular to said axes of said plurality of compartments and communicating therewith, cylindrical lens means mounted in said elongated compartment, a cover wall for said elongated compartment, said cover*

*wall being provided with slot means, said slot means being in axial alignment with said cylindrical lens.*

*8. A photoelectric system comprising a rectangular body having a plurality of cylindrical compartments therein, a cylindrical lens means axially aligned with an opening in a side wall of said rectangular body, a photo-cell device and a source of light mounted in said cylindrical compartments located in parallel contiguous relationship to each other and perpendicular to the axis of said lens means, cover means for retaining said lens means in an operative position, the cylindrical configuration of said lens means forming, in response to said source of light, a narrow beam of light which is transmitted through said opening to an object; the narrow beam of light immediately in front of said aperture being reflected from the object through said aperture, said lens focusing said narrow beam of reflected light onto the sensitive surface of said photo-cell device, whereby the beam of light finally received by said photo-cell device will have an intensity sufficient to operatively actuate said photo-cell device.*

*9. In a photoelectric system, a casing, said casing having an end wall and a side wall, cylindrical lens means extending through an opening in said side wall, said cylindrical lens having an axis parallel to said end wall, said end wall having slot means extending parallel to said lens means along a major part of the length of said lens means and communicating with said lens, a photoelectric device located internally of said casing, a light source located internally of said casing, and an opaque wall extending perpendicularly of said axis and between said light source and said photoelectric device and luminously isolating said photoelectric device from said light source except via said cylindrical lens and said slot means.*

*10. In a photoelectric system, cylindrical lens means having an axis and an outer cylindrical surface, a wall having slot means extending parallel to said axis adjacent said surface, a photo-sensitive device, a source of light, means including an opaque wall interposed between said photoelectric device and said source of light and arranged to luminously isolate said photoelectric cell from said source of light except via said lens means and said slot means, said wall extending transversely of said axis.*

*11. The combination according to claim 10 wherein is provided a unitary casing for said lens and said photoelectric device and said source of light, said wall being a partition in said casing extending perpendicularly of said axis, said casing including separate compartments for said photoelectric device and said light source, said partition separating said compartments.*

References Cited in the file of this patent or the original patent

UNITED STATES PATENTS

| | | |
|---|---|---|
| 1,601,513 | Stoekle et al. | Sept. 28, 1926 |
| 2,078,800 | Juchter | Apr. 27, 1937 |
| 2,420,716 | Morton et al. | May 20, 1947 |
| 2,688,099 | Bickley | Aug. 31, 1954 |
| 2,702,494 | Lieneweg et al. | Feb. 22, 1955 |

FOREIGN PATENTS

| | | |
|---|---|---|
| 892,429 | Germany | Oct. 8, 1953 |